US010274356B2

(12) United States Patent
Hirata et al.

(10) Patent No.: US 10,274,356 B2
(45) Date of Patent: Apr. 30, 2019

(54) LIQUID LEVEL DETECTION CIRCUIT, LIQUID LEVEL METER, CONTAINER PROVIDED WITH LIQUID LEVEL METER, AND VAPORIZER USING CONTAINER

(71) Applicant: FUJIKIN INCORPORATED, Osaka (JP)

(72) Inventors: Kaoru Hirata, Osaka (JP); Katsuyuki Sugita, Osaka (JP); Atsushi Hidaka, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 113 days.

(21) Appl. No.: 15/531,889

(22) PCT Filed: Nov. 24, 2015

(86) PCT No.: PCT/JP2015/005835
§ 371 (c)(1),
(2) Date: May 31, 2017

(87) PCT Pub. No.: WO2016/088332
PCT Pub. Date: Jun. 9, 2016

(65) Prior Publication Data
US 2017/0268919 A1 Sep. 21, 2017

(30) Foreign Application Priority Data
Dec. 2, 2014 (JP) ................. 2014-244143

(51) Int. Cl.
*G01F 23/24* (2006.01)
(52) U.S. Cl.
CPC .......... *G01F 23/246* (2013.01); *G01F 23/241* (2013.01); *G01F 23/243* (2013.01); *G01F 23/247* (2013.01)

(58) Field of Classification Search
CPC ...... G01F 23/24; G01F 23/241; G01F 23/243; G01F 23/246; G01F 23/247
See application file for complete search history.

(56) References Cited

U.S. PATENT DOCUMENTS 5,031,126 A * 7/1991 McCulloch ............. G01F 1/698
340/622
5,137,370 A * 8/1992 McCulloch ........... G01F 23/246
374/164

(Continued)

FOREIGN PATENT DOCUMENTS

JP S61-189161 U 11/1986
JP H07-063592 A 3/1995

(Continued)

OTHER PUBLICATIONS

International Search Report issued in PCT/JP2015/005835; dated Feb. 9, 2016.

*Primary Examiner* — Justin N Olamit
(74) *Attorney, Agent, or Firm* — Studebaker & Brackett PC (57) ABSTRACT

A liquid level meter includes a first resistive temperature detector; a first temperature measuring body a liquid level detection section a temperature detection section detecting the temperatures of the first resistive temperature detector and the first temperature measuring body; a current control section determining a value of a current to apply to the first resistive temperature detector such that a difference between the temperatures of the first resistive temperature detector and the first temperature measuring body detected by the temperature detection section to be a first constant value; and a power supply unit supplying a current of the determined current value to the first resistive temperature detector; wherein the liquid level detection section determines whether the first resistive temperature detector is present in (Continued)

a liquid or outside of the liquid using the value of the current applied to the first resistive temperature detector.

13 Claims, 7 Drawing Sheets

(56) References Cited

U.S. PATENT DOCUMENTS

| | | | | |
|---|---|---|---|---|
| 5,685,194 | A * | 11/1997 | McCulloch | G01F 1/696 |
| | | | | 73/204.11 |
| 6,644,103 | B1 * | 11/2003 | Hall | G01F 23/246 |
| | | | | 324/664 |
| 6,758,084 | B2 * | 7/2004 | Hall | G01F 23/246 |
| | | | | 324/664 |
| 6,822,460 | B2 * | 11/2004 | Pelkey | G01F 23/247 |
| | | | | 324/694 |
| 2003/0046997 | A1 * | 3/2003 | Waller | F25B 31/002 |
| | | | | 73/295 |
| 2011/0100483 | A1 | 5/2011 | Nagata et al. | |

FOREIGN PATENT DOCUMENTS

| | | |
|---|---|---|
| JP | 3009809 B2 | 2/2000 |
| JP | 2001-099692 A | 4/2001 |
| JP | 2009-252760 A | 10/2009 |
| JP | 2010-180429 A | 8/2010 |
| JP | 2013-77710 A | 4/2013 |
| JP | 5400816 B2 | 1/2014 |
| WO | 2009/122646 A1 | 10/2009 |
| WO | 2013/046517 A1 | 4/2013 |

* cited by examiner

Prior Art

FIG. 9

Prior Art

LIQUID LEVEL DETECTION CIRCUIT, LIQUID LEVEL METER, CONTAINER PROVIDED WITH LIQUID LEVEL METER, AND VAPORIZER USING CONTAINER

TECHNICAL FIELD

The present invention relates to a liquid level meter detecting a liquid level and a liquid level detection circuit used for the liquid level meter.

BACKGROUND ART

For example, a liquid material vaporization and supply apparatus for supplying a liquid raw material to semiconductor manufacturing equipment utilizing Metal Organic Chemical Vapor Deposition method (MOCVD method) is conventionally proposed (Patent Documents 1 to 3, for example).

The liquid material vaporization and supply apparatus of this kind heats and vaporizes a liquid raw material such as TEOS (Tetraethyl orthosilicate) in a vaporization chamber and supplies the vaporized gas to the semiconductor manufacturing equipment at a predetermined flow rate controlled by a flow rate control devise. Here, a liquid level needs to be controlled by detecting the liquid raw material level so that the amount of the liquid raw material reduced due to the vaporization can be supplied.

For example, a pressure-detection-type liquid level detection device detecting a reduction of a liquid raw material due to vaporization in a vaporizer by monitoring a pressure reduction in the vaporizer (such as Patent Document 2) and a thermal-type liquid level detection device utilizing a difference in heat dissipation constants between a liquid phase and a gas phase (such as Patent Documents 4 to 6) are known as tools for detecting a liquid level of a liquid raw material.

Figure 8:
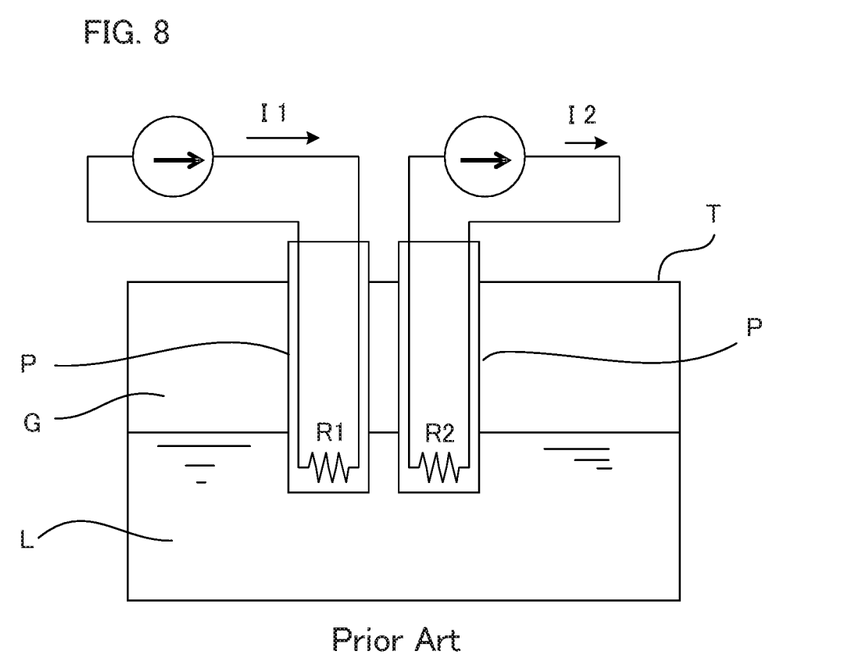
FIG. 8 is a schematic configuration diagram illustrating a conventional liquid level meter.

In the thermal-type liquid level detection device of this kind, as illustrated in FIG. 8, two protecting tubes P with respectively enclosed resistive temperature detectors R1 and R2 made of platinum or the like are vertically inserted into a container T, and a comparatively large constant current I1 (heating current) is supplied to the resistive temperature detector R1 for keeping a temperature of the resistive temperature detector R1 higher than an ambient temperature by the self-heating while a micro constant current I2 (current for measuring the ambient temperature) which only generates ignorable heat and is little enough for measuring the ambient temperature is supplied to the resistive temperature detector R2.

Then, the resistive temperature detector R1 to which the large constant current has been supplied generates heat. Here, the temperature of the resistive temperature detector in a gas phase G is higher than the temperature of the resistive temperature detector in a liquid phase L because the heat dissipation constant when the resistive temperature detector is in the liquid phase L is larger than the heat dissipation constant when the resistive temperature detector is in the gas phase G.

This means that a resistance value of a resistive temperature detector is larger when the resistive temperature detector is in the gas phase than when the resistive temperature detector is in the liquid phase. Therefore, it can be determined if the resistive temperature detector is located above or below the liquid surface by measuring a difference (absolute value) between a voltage output of the resistive temperature detector R1 to which the larger current has been supplied and a voltage output of the resistive temperature detector R2 to which the micro current has been supplied. In other words, it can be determined that the resistive temperature detector is located below the liquid surface in case the difference is smaller and the resistive temperature detector is located above the liquid surface in case the difference is larger.

Figure 9:
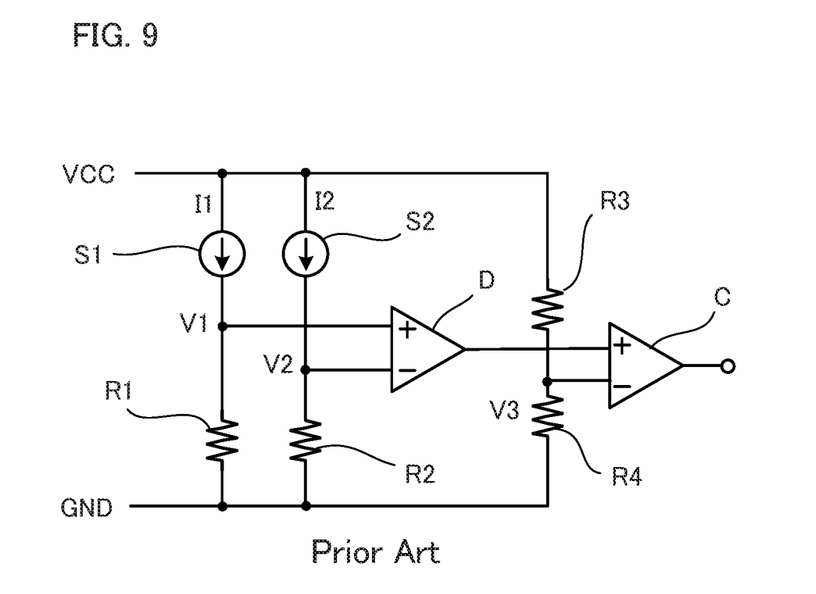
FIG. 9 is a circuit diagram illustrating an example of a liquid level detection circuit of the conventional liquid level meter.

FIG. 9 illustrates an example of a liquid level detection circuit and the constant currents are respectively supplied from a power source Vcc to the resistive temperature detectors R1 and R2 via constant current circuits S1 and S2. The constant current circuit S1 is configured to have a current larger than a current flowing through the constant current circuit S2 flow therethrough so that the micro current which is weak enough to generate the ignorable heat and allows the ambient temperature measurement flows through the resistive temperature detector R2 and the comparatively larger current of a current value larger than that of the current flowing through the resistive temperature detector R2 which heats the resistive temperature detector R1 to the high temperature. A terminal voltage V1 of the resistive temperature detector R1 and a terminal voltage V2 of the resistive temperature detector R2 are respectively inputted to an inversion input and a non-inversion input of a differential amplification circuit D and then a voltage signal corresponding to a voltage difference (V1−V2) between the terminal voltage V1 and the terminal voltage V2 is inputted to a comparator C. The comparator C compares the voltage difference (V1−V2) to a reference voltage V3 predetermined by dividing resistors R3 and R4.

When the resistive temperature detector R1 is in the liquid phase, a temperature rise of the resistive temperature detector R1 relative to the ambient temperature is smaller than the temperature rise when the resistive temperature detector R1 is in the gas phase. As a result, the output voltage from the differential amplification circuit D corresponding to the difference between the voltage signal outputted from the resistive temperature detector R1 and the voltage signal corresponding to the ambient temperature outputted from the resistive temperature detector R2 which is also in the liquid phase becomes lower than the reference voltage, and the output from the comparator C accordingly goes to a low level. On the other hand, when the liquid level drops and the resistive temperature detector R1 is exposed in the gas phase, the temperature rise relative to the ambient temperature becomes equivalent to the temperature rise of the resistive temperature detector R1 in the gas phase. Thus, the output voltage from the differential amplification circuit D corresponding to the difference between the voltage signal outputted from the resistive temperature detector R1 and the voltage signal corresponding to the ambient temperature outputted from the resistive temperature detector R2 which is also in the gas phase becomes higher than the reference voltage, and the output from the comparator C accordingly reaches a high level. Therefore, it is determined that the resistive temperature detectors R1 and R2 are in the gas phase when the output from the comparator C is the high level and that the resistive temperature detectors R1 and R2 are in the liquid phase when the output from the comparator C is the low level.

By measuring the terminal voltages V1 and V2, resistance values of the resistive temperature detector R1 and R2 can be calculated from the current values I1 and I2 by applying Ohm's law, and then the temperatures of the resistive temperature detectors R1 and R2 can be derived from the resistance values of the resistive temperature detectors R1 and R2 in case resistance change rates against the temperatures of the resistive temperature detectors R1 and R2 are known. Therefore, in the liquid level detection circuit, instead of by comparing the voltage outputs from the resistive temperature detectors R1 and R2, the liquid level determination can be done by comparing the resistance values of the resistive temperature detectors R1 and R2, or by calculating the temperatures of the resistive temperature detectors R1 and R2 from the respective resistance values using the resistance change rates against the temperatures of the resistive temperature detectors R1 and R2 and then comparing the calculated temperatures.

CITATION LIST

Patent Literature

Patent Document 1: Japanese Laid-Open Patent Publication No. 2009-252760
Patent Document 2: Japanese Laid-Open Patent Publication No. 2010-180429
Patent Document 3: Japanese Laid-Open Patent Publication No. 2013-77710
Patent Document 4: Japanese Patent No. 3009809
Patent Document 5: Japanese Patent No. 5400816
Patent Document 6: Japanese Laid-Open Patent Publication No. 2001-99692

SUMMARY OF INVENTION

Technical Problem

In the above described conventional liquid level detections, a constant current circuit which respectively supplies constant currents to resistive temperature detectors to compare resistance values of the resistive temperature detectors is used as a drive circuit. When a constant current circuit is used as a drive circuit, however, there are issues such as an effect of an ambient temperature during measurement and currents larger than necessary applied to the resistive temperature detectors.

A primary object of the present invention is to provide a liquid level detection circuit and a liquid level meter which can solve the above problems.

Solution to Problem

To achieve the object, a liquid level meter according to a first aspect of the present invention includes a first resistive temperature detector to which a current of an optional magnitude is applied, a first temperature measuring body provided close to the first resistive temperature detector, and a liquid level detection section detecting a liquid level based on temperatures of the first resistive temperature detector and the first temperature measuring body, and further includes a temperature detection section detecting the temperatures of the first resistive temperature detector and the first temperature measuring body, a current control section determining a value of a current to apply to the first resistive temperature detector so that a difference between the temperature of the first resistive temperature detector and the temperature of the first temperature measuring body is maintained at a first constant value, and a power supply unit applying the current of the current value determined by the current control section to the first resistive temperature detector, wherein the liquid level detection section determines whether the first resistive temperature detector is located in a liquid or outside of the liquid using the value of the current applied to the first resistive temperature detector.

The first temperature measuring body may be a second resistive temperature detector to which a current weaker than the current applied to the first resistive temperature detector is applied.

The liquid level detection section can determine whether the first resistive temperature detector is in the liquid or outside of the liquid by determining if the value of the current applied to the first resistive temperature detector is larger than a predetermined first threshold or not.

The liquid level meter further includes a voltage measuring section measuring a voltage across the first resistive temperature detector and the temperature detection section can determine the temperature of the first resistive temperature detector from the voltage across the first resistive temperature detector measured by the voltage measuring section. In case the temperature difference is larger than a predetermined reference value, the current control section determines a smaller value comparing to the value of the current being applied to the first resistive temperature detector as a value of a current to apply to the first resistive temperature detector, in case the difference is smaller than the reference value, the current control section determines a larger value comparing to the value of the current being applied to the first resistive temperature detector as a value of a current to apply to the first resistive temperature detector, and in case the difference is equal to the reference value, the current control section determines the same value as the value of the current being applied to the first resistive temperature detector as a value of a current to apply to the first resistive temperature detector.

The liquid level meter may further include a second resistive temperature detector to which a current of an optional magnitude is applied, wherein the second resistive temperature detector is disposed at a different height from that of the first resistive temperature detector, the temperature detection section detects a temperature of the second resistive temperature detector, the current control section determines a value of a current to apply to the second resistive temperature detector so that a difference between the temperature of the second resistive temperature detector and the temperature of the first temperature measuring body is maintained at a second constant value, the power supply unit applies the current of the value of the current to apply to the second resistive temperature detector determined by the current control section to the second resistive temperature detector, and the liquid level detection section determines whether the second resistive temperature detector is in the liquid or outside of the liquid using the value of the current applied to the second resistive temperature detector.

The second resistive temperature detector may be disposed at a lower position than those of the first resistive temperature detector and the first temperature measuring body.

The liquid level meter may further include a second resistive temperature detector to which the current of the optional magnitude is applied and a second temperature measuring body disposed near the second resistive temperature detector, wherein the second resistive temperature detector is disposed at the different height from that of the first resistive temperature detector, the temperature detection section detects a temperature of the second resistive temperature detector and a temperature of the second temperature measuring body, the current control section determines the value of the current to apply to the second resistive temperature detector so that a difference between the temperature of the second resistive temperature detector and the temperature of the second temperature measuring body is maintained at a second constant value, the power supply unit applies the current of the value of the current to apply to the second resistive temperature detector determined by the current control section to the second resistive temperature detector, and the liquid level detection section determines whether the second resistive temperature detector is in the liquid or outside of the liquid using the value of the current applied to the second resistive temperature detector.

The second resistive temperature detector and the second temperature measuring body are disposed at higher positions than those of the first resistive temperature detector and the first temperature measuring body. When the difference between the temperature of the first resistive temperature detector and the temperature of the first temperature measuring body becomes larger than the first constant value, the liquid level detection section outputs a signal to raise the liquid level and when the difference between the temperature of the first resistive temperature detector and the temperature of the first temperature measuring body becomes smaller than the first constant value, the liquid level detection section outputs a signal to stop the rise of the liquid level.

In case the difference between the temperature of the first resistive temperature detector and the temperature of the first temperature measuring body becomes smaller than the first constant value within a predetermined period of time after the difference between the temperature of the first resistive temperature detector and the temperature of the first temperature measuring body once becomes larger than the first constant value, the liquid level detection section may keep outputting the signal to raise the liquid level instead of outputting the signal to stop the rise of the liquid level.

When the difference between the temperature of the second resistive temperature detector and the temperature of the second temperature measuring body becomes smaller than the second constant value, the liquid level detection section may output the signal to stop the rise of the liquid level.

The first resistive temperature detector, the second resistive temperature detector, the first temperature measuring body, and the second temperature measuring body may be platinum resistive temperature detectors.

A container according to a second aspect of the present invention includes the liquid level meter attached thereto and a level of a liquid contained therein is detected by the liquid level meter.

A vaporizer according to a third aspect of the present invention includes the container and the liquid to be vaporized is contained in the container.

A liquid level detection circuit according to a fourth aspect of the present invention includes a bridge circuit including a first line where a self-heating resistive temperature detector and a first resistor are connected in series and a second line, where a second resistor and a third resistor are connected in series, connected with the first line in parallel and to which a smaller current comparing to the current supplied to the first line is supplied; a transistor connected to the bridge circuit in series for supplying the current from the power supply unit to the bridge circuit; a third line connected between the second and third resistors where a fourth resistor having the same resistance as that of the first resistor, a fifth resistor and an ambient temperature measuring resistive temperature detector which is a resistive temperature detector of the same type as the self-heating resistive temperature detector are connected in series; a fourth line connected between the self-heating resistive temperature detector and the first resistor where sixth and seventh resistors of the same ratio of the resistances of the second and third resistors are connected in series; a comparator with a non-inverted input terminal to which a first electrical potential between the fourth and fifth resistors is inputted and an inverted input terminal to which a second electrical potential between the sixth and seventh resistors is inputted; and a fifth line applying an output potential of the comparator as a base voltage to the transistor; wherein the output potential of the comparator is regarded as a detection output.

A buffer circuit can be connected to the third line.
A buffer circuit can be connected to the fourth line.
The fifth resistor may be a variable resistor.
The self-heating resistive temperature detector and the ambient temperature measuring resistive temperature detector may be the platinum resistive temperature detectors.
The resistances of the second resistor and the sixth resistor may be the same and the resistances of the third resistor and the seventh resistor may be the same.

A liquid level meter according to a fifth aspect of the present invention includes the liquid level detection circuit.

Advantageous Effects of Invention

In a liquid level detection circuit and a liquid level meter according to the present invention, liquid detection can be conducted without being affected by an ambient temperature because a self-heating resistive temperature detector and an ambient temperature measuring resistive temperature detector are driven with a constant temperature difference, and a longer service life can be achieved because the temperatures can be controlled with the constant difference and power more than necessary is not applied to the resistive temperature detectors.

DESCRIPTION OF EMBODIMENTS

Hereinafter, embodiments of a liquid level detection circuit according to the present invention are described with reference to drawings, wherein the same reference numerals designate corresponding or identical elements throughout all drawings and embodiments.

First Embodiment

Figure 1:
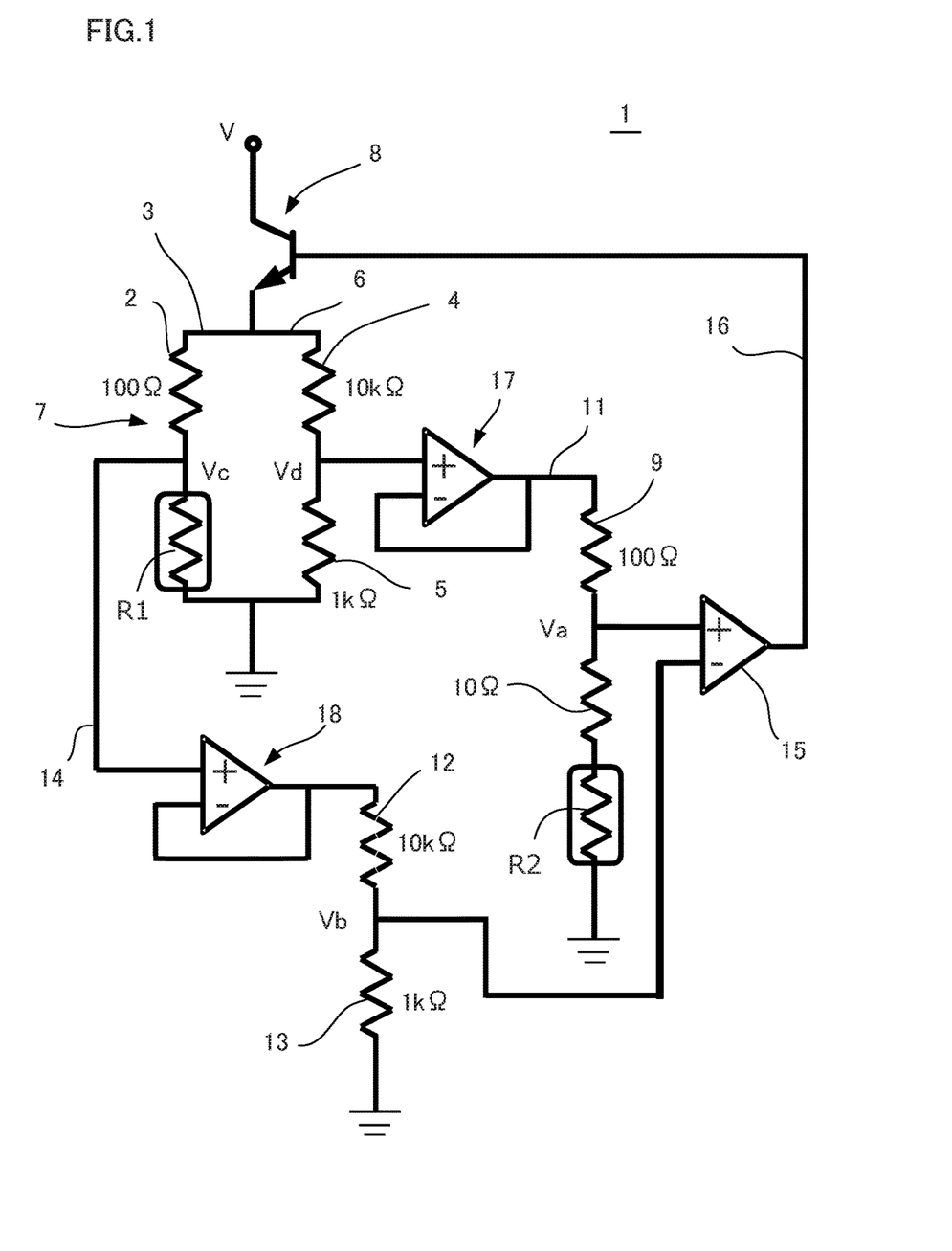
FIG. 1 is a circuit diagram illustrating a liquid level detection circuit according to a first embodiment of the present invention.

FIG. 1 shows a liquid level detection circuit according to a first embodiment of the present invention. FIG. 8 should be referred for an arrangement example of a liquid level meter using a liquid level detection circuit according to the present invention.

As shown in FIG. 1, a liquid level detection circuit 1 includes a bridge circuit 7 including a first line 3 where a self-heating resistive temperature detector R1 and a first resistor 2 are connected in series and a second line 6 where a second resistor 4 and a third resistor 5 are connected in series connected with the first line 3 in parallel and to which a smaller current comparing to a current supplied to the first line 3 is supplied, an nMOS transistor 8 connected to the bridge circuit 7 in series for supplying a current from a power supply unit V to the bridge circuit 7, a third line 11 connected between the second resistor 4 and the third resistor 5 where a fourth resistor 9 and a fifth resistor 10 each having the same resistance as that of the first resistor 2 and an ambient temperature measuring resistive temperature detector R2 which is the same type of resistive temperature detector used as the self-heating resistive temperature detector R1 are connected in series, a fourth line 14 connected between the self-heating resistive temperature detector R1 and the first resistor 2 where a sixth resistor 12 having the same resistance as that of the second resistor 4 and a seventh resistor 13 having the same resistance as that of the third resistor 5 are connected in series, a comparator 15 with a non-inverted input terminal to which a first electrical potential Va between the fourth resistor 9 and the fifth resistor 10 is inputted and an inverted input terminal to which a second electrical potential Vb between the sixth resistor 12 and the seventh resistor 13 is inputted, and a fifth line 16 applying an output potential of the comparator 15 as a base voltage to the transistor 8, where the output potential of the comparator 15 is regarded as a liquid level detection output.

A buffer circuit 17 is connected to the third line 11 for stabilizing a voltage output from the bridge circuit 7 to the third line 11. Similarly, A buffer circuit 18 is connected to the fourth line 14 for stabilizing a voltage output from the bridge circuit 7 to the fourth line 14. The third line 11 and the fourth line 14 are both connected to a grand.

In the shown example, the first resistor 2 as well as the fourth resistor 9 are 100Ω, the second resistor 4 as well as the sixth resistor 12 are 10 kΩ, and the third resistor 5 and the seventh resistor are 1 kΩ. In the shown example, the fifth resistor 10 is a variable resistor with a maximum resistance of 50Ω and adjusted to 8Ω. The power supply unit V generates DC12V.

In the shown example, the self-heating resistive temperature detector R1 and the ambient temperature measuring resistive temperature detector R2 are both platinum resistive temperature detectors made of Pt100 specified by Japanese Industrial Standards (JIS) or IEC standards with a nominal resistance of 100Ω. The platinum resistive temperature detector is suitable as the resistive temperature detector because a relation between the resistance and the temperature linearly changes and a rate of the change is great and excellent in reproducibility. The platinum resistive temperature detector can include a platinum resistance element, inner conductor wires, an insulating material, a protecting tube, and terminals.

Hereinafter, an operation of the liquid level detection circuit 1 with the above configuration will be described.

When the transistor 8 is on, the power source V supplies a current to the bridge circuit 7 and a current larger than a current flowing through the second line flows through the first line 3. The current flowing through the first line 3 is a heating current that makes the self-heating resistive temperature detector R1 heat itself and keeps a temperature of the self-heating resistive temperature detector R1 higher than an ambient temperature.

An output voltage Vc at a connecting point with the bridge circuit 7 of the first line 3 is stabilized by the buffer circuit 18 and divided by the sixth resistor 12 and the seventh resistor 13, and then the output voltage Vb between the sixth resistor 12 and the seventh resistor 13 is inputted to the inverted input terminal of the comparator 15.

On the other hand, a current for supplying a micro current (current for ambient temperature measurement) which is weak enough to generate ignorable heat allowing ambient temperature measurement to the third line 11 flows in the second line 6 of the bridge circuit 7. An output voltage Vd at a connecting point with the bridge circuit 7 of the third line 11 is stabilized by the buffer circuit 17 and divided by the fourth resistor 9, the fifth resistor 10, and the ambient temperature measuring resistive temperature detector R2, and then the output voltage Va between the fourth resistor 9 and the fifth resistor 10 is inputted to the non-inverted input terminal of the comparator 15.

As a configuration of the circuit clearly shown in FIG. 1, when a resistance value ($R_1$) of the self-heating resistive temperature detector R1 is smaller than a total ($R_2$+R) of a resistance value (R) of the fifth resistor 10 and a resistance value ($R_2$) of the ambient temperature measuring resistive temperature detector R2 ($R_1$<$R_2$+R), the non-inversion input is larger than the inversion input at the comparator 15, and the comparator 15 is at a high level and outputs the base voltage (5V) to the transistor 8 to turn on the transistor 8 and then the current from the power source V is supplied to the bridge circuit 7.

When the resistance value ($R_1$) of the self-heating resistive temperature detector R1 increases as the self-heating resistive temperature detector R1 heats itself and becomes larger than the total ($R_2$+R) of the resistance value (R) of the fifth resistor 10 and the resistance value ($R_2$) of the ambient temperature measuring resistive temperature detector R2 ($R_1$>$R_2$+R), the inversion input becomes larger than the non-inversion input at the comparator 15 and the comparator 15 turns to a low level, and since the base voltage is not provided to the transistor 8, the transistor 8 becomes off and the current from the power source V is not supplied to the bridge circuit 7. Therefore, when the temperature of the self-heating resistive temperature detector R1 becomes too high due to the self-heating and the resistance value becomes too large, the supply of the heating current is stopped.

As described above, the liquid level detection circuit 1 conducts a feedback control to keep the resistance value ($R_1$) of the self-heating resistive temperature detector R1 equal to the total of the resistance value (R) of the fifth resistor 10 and the resistance value ($R_2$) of the ambient temperature measuring resistive temperature detector R2 (i.e. $R_1$=$R_2$+R).

It can be determined that the self-heating resistive temperature detector R1 is in a gas phase (G) when the output of the comparator 15 is at the low level because this means that a heat radiation amount from the self-heating resistive temperature detector R1 is smaller and the resistance value is larger. On the other hand, it can be determined that the self-heating resistive temperature detector R1 is in a liquid phase (L) when the output of the comparator 15 is at the high level because this means that the heat radiation amount from the self-heating resistive temperature detector R1 is larger and the resistance value is smaller.

With the liquid level detection circuit with the above described configuration, detection of the liquid level can be conducted without being affected by the ambient temperature because the self-heating resistive temperature detector R1 and the ambient temperature measuring resistive temperature detector R2 are controlled with a constant temperature difference.

In addition, a service-life can be prolonged because the temperatures can be controlled with the constant difference and excessive power is not applied to the resistive temperature detectors.

Furthermore, a production cost can be reduced since the resistive temperature detectors of the same specification such as the 100Ω platinum resistive temperature detectors that are general-purpose products can be used as the self-heating resistive temperature detector R1 and the ambient temperature measuring resistive temperature detector R2.

In the above described embodiment, the second resistor 4 and the sixth resistor 12 have the same resistance value and the third resistor 5 and the seventh resistor 13 have the same resistance value, however this is not the only possible condition but other conditions are also possible as long as a ratio (Ra/Rb) of a resistance value (Ra) of the second resistor 4 to a resistance value (Rb) of the third resistor 5 is the same as a ratio (Rc/Rd) of a resistance value (Rc) of the sixth resistor 12 to a resistance value (Rd) of the seventh resistor 13 (i.e. (Ra/Rb)=(Rc/Rd)).

Here, for a continuous operation of the circuit shown in FIG. 1, a circuit for turning the transistor 8 on again after the transistor 8 once turns off may be provided. For example, a resistor with a predetermined resistance may be connected in parallel with the transistor 8 between the power source V and the first resistor 2.

Second Embodiment

Figure 2:
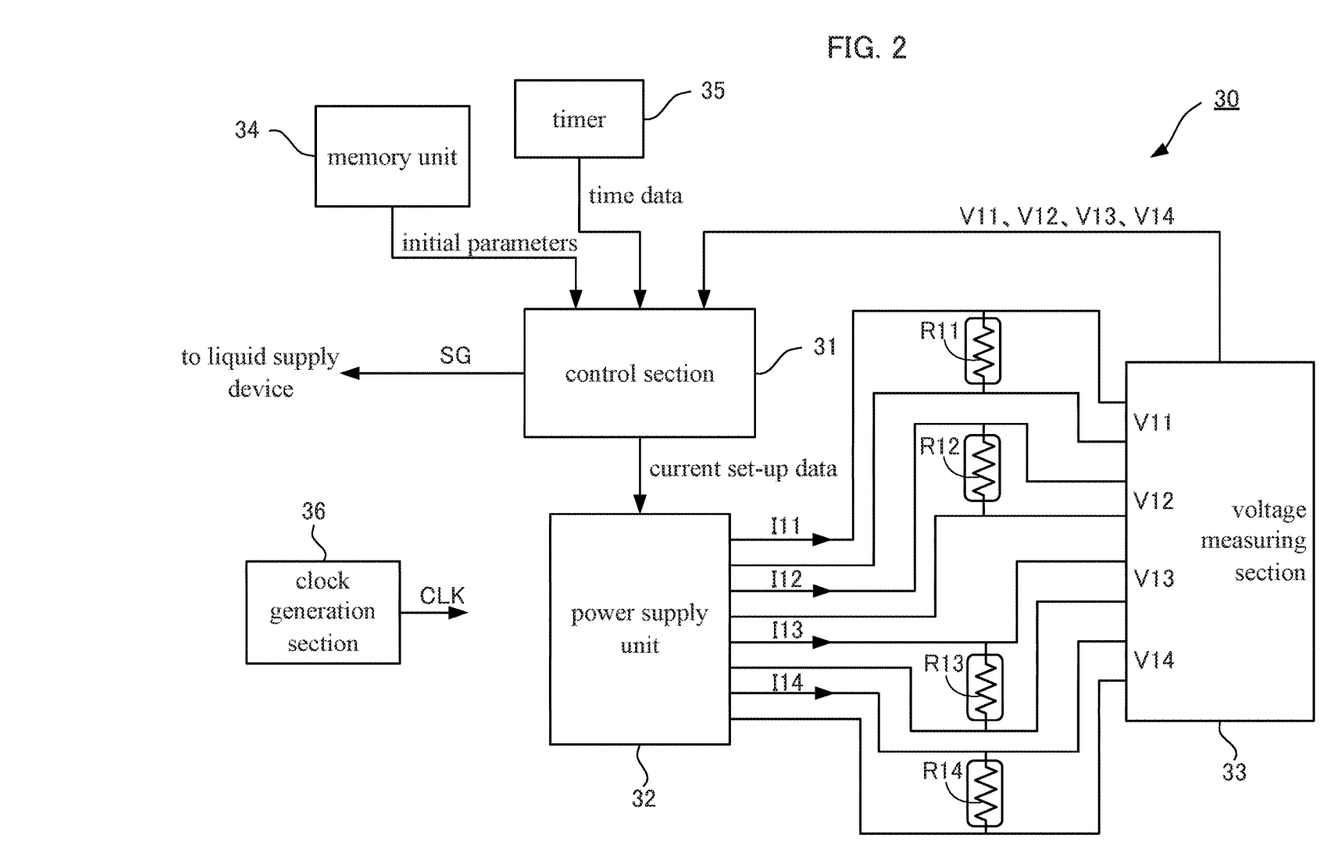
FIG. 2 is a block diagram illustrating a liquid level meter according to a second embodiment of the present invention.

FIG. 2 shows a schematic configuration of a liquid level meter according to a second embodiment of the present invention. The liquid level meter 30 according to the embodiment includes first to fourth resistive temperature detectors R11 to R14, a control section 31, a power supply unit 32, a voltage measuring section 33, a memory unit 34, a timer 35, and a clock generation section 36. Although not shown in FIG. 2, the liquid level meter 30 includes components required to function as a liquid level meter such as a power source for supplying required power to each section.

Figure 3:
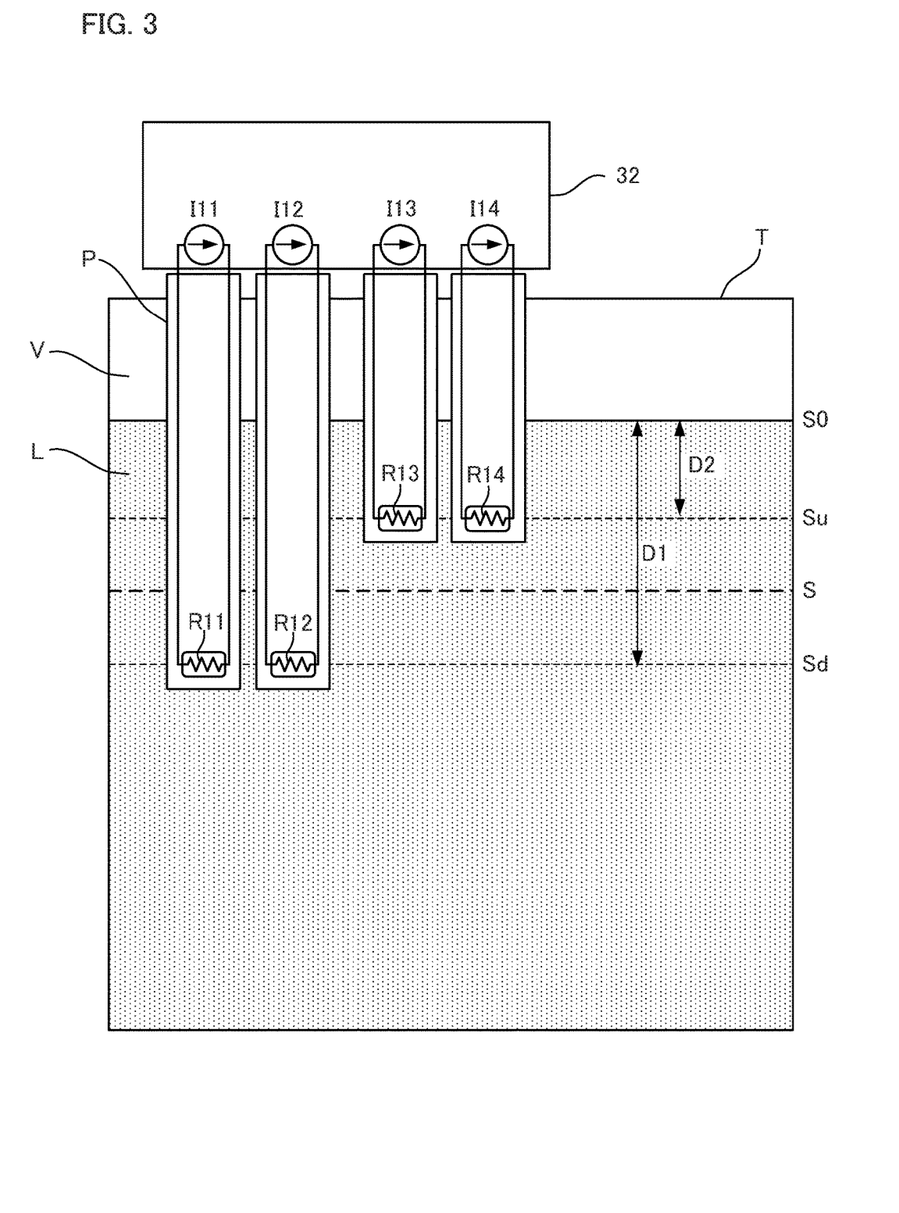
FIG. 3 is a schematic diagram illustrating an arrangement of first to fourth resistive temperature detectors of the liquid level meter according to the second embodiment of the present invention.

All the first to fourth resistive temperature detectors R11 to R14 are Pt100 platinum resistive temperature detectors (whose resistance value at 0° C. is 100Ω) as in the case of the first embodiment. Referring to FIG. 3, the first to fourth resistive temperature detectors R11 to R14 are respectively enclosed in protecting tubes P and disposed in a container T containing a predetermined liquid (liquid phase) L as the same as the case shown in FIG. 8. The first resistive temperature detector R11 and the second resistive temperature detector R12 are disposed at the same height (the same distance D1 from an initial liquid level S0) and the third resistive temperature detector R13 and the fourth resistive temperature detector R14 are disposed at the same height which is higher than the height where the first resistive temperature detector R11 and the second resistive temperature detector R12 are disposed (the same distance D2 from the initial liquid level S0 (D2<D1)). The liquid level of the liquid L goes below the initial liquid level S0 (a liquid level after the drop is indicated as S) as a gas (gas phase) G produced by vaporization of the liquid L is supplied to an external device.

The control section 31 controls the whole liquid level meter 30. The control section 31 can, for example, include a known semiconductor arithmetic element (CPU) and a semiconductor memory device (RAM or the like). A predetermined program executed by the control section 31 is stored in the memory unit 34. When a power to the liquid meter 30 is turned on, the control section 31 reads out the predetermined program from a prescribed address of the memory unit 34 and executes it. As described later, the control section 31 detects the liquid level changes by the first to fourth resistive temperature detectors R11 to R14, and outputs a liquid supply signal SG to a liquid supply device so that the liquid supply device which is an external device starts or stops supplying the liquid into the container T based on the detected liquid level.

The control section 31 inputs current set-up data to the power supply unit 32, and the power supply unit 32 respectively supplies currents I11 to I14 to the first to fourth resistive temperature detectors R11 to R14 corresponding to the input current set-up data. The power supply unit 32 includes a D/A converter and generates the analog currents I11 to I14 corresponding to the digital current set-up data received from the control section 31. The power supply unit 32 may include 4 sets of known D/A converters and amplifiers.

The voltage measuring section 33 measures respective voltages V11 to V14 across the first to fourth resistive temperature detectors R11 to R14 and outputs the measurements of V11 to V14 to the control section 31. The voltage measuring section 33 includes an A/D converter and the measurements V11 to V14 are digital data generated from analogue voltages. The voltage measuring section 33 may include a known digital voltmeter IC or 4 sets of known amplifiers and A/D converters.

The memory unit 34 also stores default values of parameters (hereinafter referred to as initial parameters) which the control section 31 requires for controlling the whole liquid level meter 30. The control section 31 reads out the initial parameters from the memory unit 34 immediately after the above program is executed.

The timer 35 generates time data from an inputted clock and inputs it to the control section 31. The clock generation section 36 generates a clock required for the operation of each of sections and units and supplies the clock to each of them.

An operation principle of the liquid level meter 30 is the same as the one in the first embodiment. In other words, temperatures of the first to fourth resistive temperature detectors R11 to R14 rise when they are electrified. Due to the resistance-temperature linearity of the platinum resistive temperature detector, respective temperatures T1 to T4 of the first to fourth resistive temperature detectors R11 to R14 can be calculated from the respective voltages V11 to V14 across the first to fourth resistive temperature detectors R11 to R14. Specifically, a temperature Tj (° C.) of an R1j (j=1 to 4) is calculated by a formula Tj={(V1j/I1j)−R1j(0)}/(α× R1j(0)) using a resistance value R1j(0) at 0° C. and a present current value I1j. Here, α is a temperature coefficient (Ω/° C.) when the resistance value is a linear function of the temperature and α is 0.003851 in case of the Pt100 platinum resistive temperature detector.

Out of the first to fourth resistive temperature detectors R11 to R14, as described above, constant micro currents (for example, 2 mA) are supplied to the second resistive temperature detector R12 and the fourth resistive temperature detector R14, and currents (heating currents) that are larger than the currents supplied to the second resistive temperature detector R12 and the fourth resistive temperature detector R14 are supplied to the first resistive temperature detector R11 and the third resistive temperature detector R13 so that the temperatures of the first resistive temperature detector R11 and the third resistive temperature detector R13 are kept higher than the ambient temperature by the self-heating. The first resistive temperature detector R11 and the third resistive temperature detector R13 correspond to the self-heating resistive temperature detector R1 in the first embodiment, and the second resistive temperature detector R12 and the fourth resistive temperature detector R14 correspond to the ambient temperature measuring resistive temperature detector R2 in the first embodiment. T1−T2 is affected by surrounding conditions (thermal conductivity) of the first resistive temperature detector R11 and the second resistive temperature detector R12. In other words, when the first resistive temperature detector R11 and the second resistive temperature detector R12 are in the liquid L, T1−T2 is smaller (a heat radiation effect is large) and when the first resistive temperature detector R11 and the second resistive temperature detector R12 are in the gas G, T1−T2 is larger (the heat radiation effect is small). Similarly, when the third resistive temperature detector R13 and the fourth resistive temperature detector R14 are in the liquid L, T3−T4 is smaller and when the third resistive temperature detector R13 and the fourth resistive temperature detector R14 are in the gas G, T3−T4 is larger. Therefore, a positional relation among the liquid level S, a first level Su which is an upper limit, and a second level Sd which is a lower limit can be determined by measuring T1−T2 as well as T3−T4.

Figure 4:
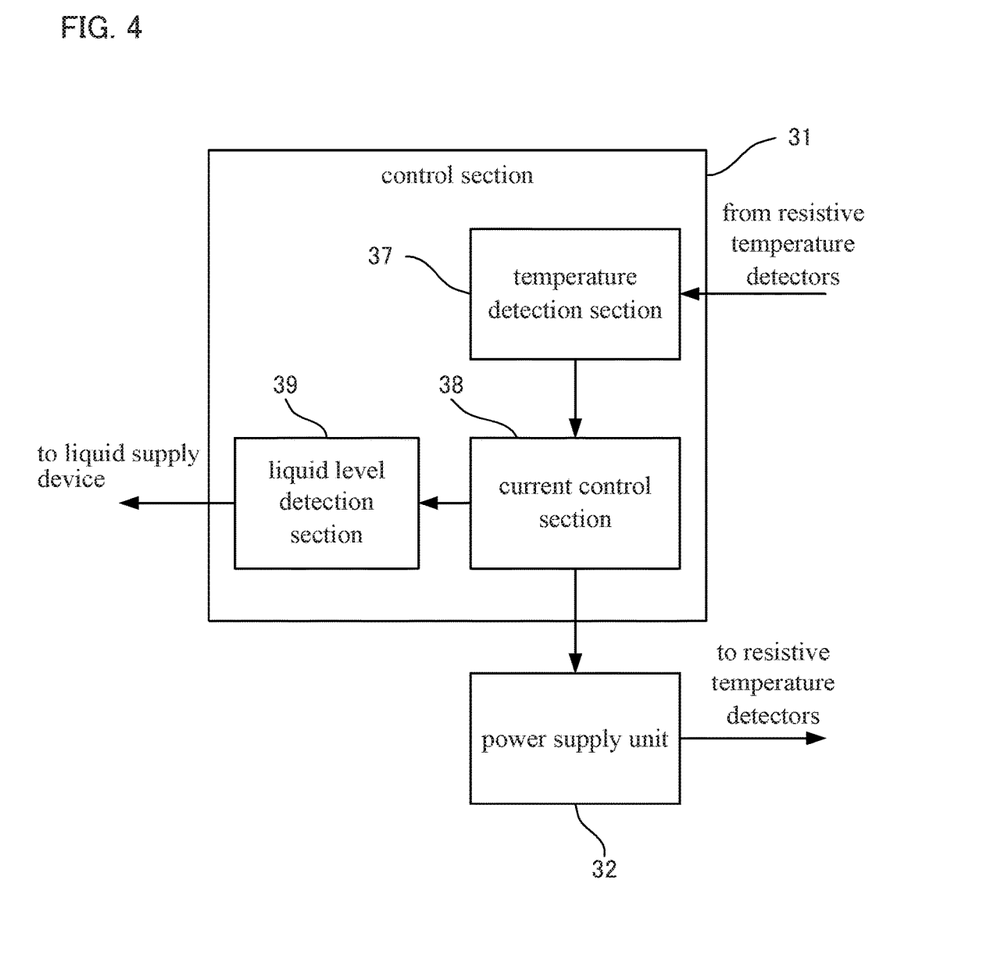
FIG. 4 is a block diagram illustrating a function of a control section.

In this embodiment, the control section 31 conducts a feedback control over the value of the current supplied to the first resistive temperature detector R11 so that T1−T2=ΔTd where ΔTd is a predetermined value. The control section 31 also conducts a feedback control over the value of the current supplied to the third resistive temperature detector R13 so that T3−T4=ΔTu where ΔTu is a predetermined value. Specifically, referring to a block diagram in FIG. 4 illustrating a function of the control section 31, a temperature detection section 37 calculates the present temperature Tj (j=1 to 4) based on the current V1j (j=1 to 4) by the above formula and then a current control section 38 changes the value of the current I11 based on the calculation result so that T1−T2=ΔTd is established. In other words, the current control section 38 controls the power supply unit 32 to decrease the current I11 when T1−T2>ΔTd, to increase the current I11 when T1−T2<ΔTd, and to keep the present current value when T1−T2=ΔTd. Similarly, the current control section 38 controls the power supply unit 32 to decrease the current I13 when T3−T4>ΔTu, to increase the current I13 when T3−T4<ΔTu, and to keep the present current value when T3−T4=ΔTu. The temperature detection section 37, the current control section 38, and the power supply unit 32 repeat the above feedback control and a liquid level detection section 39 determines the positional relation among the present liquid level S, the first level Su, and the second level Sd by comparing the present current value to a predetermined reference value. The liquid level detection section 39 controls the liquid supply device based on the liquid level.

Here, it is preferred to set upper limits to the currents I11 and I13 not to let the currents I11 and I13 be limitlessly set to large values. In other words, when the current I11 is increased and a newly set current value exceeds the upper limit, the present value of the current I11 is maintained. The same is true for the current I13.

Figure 5:
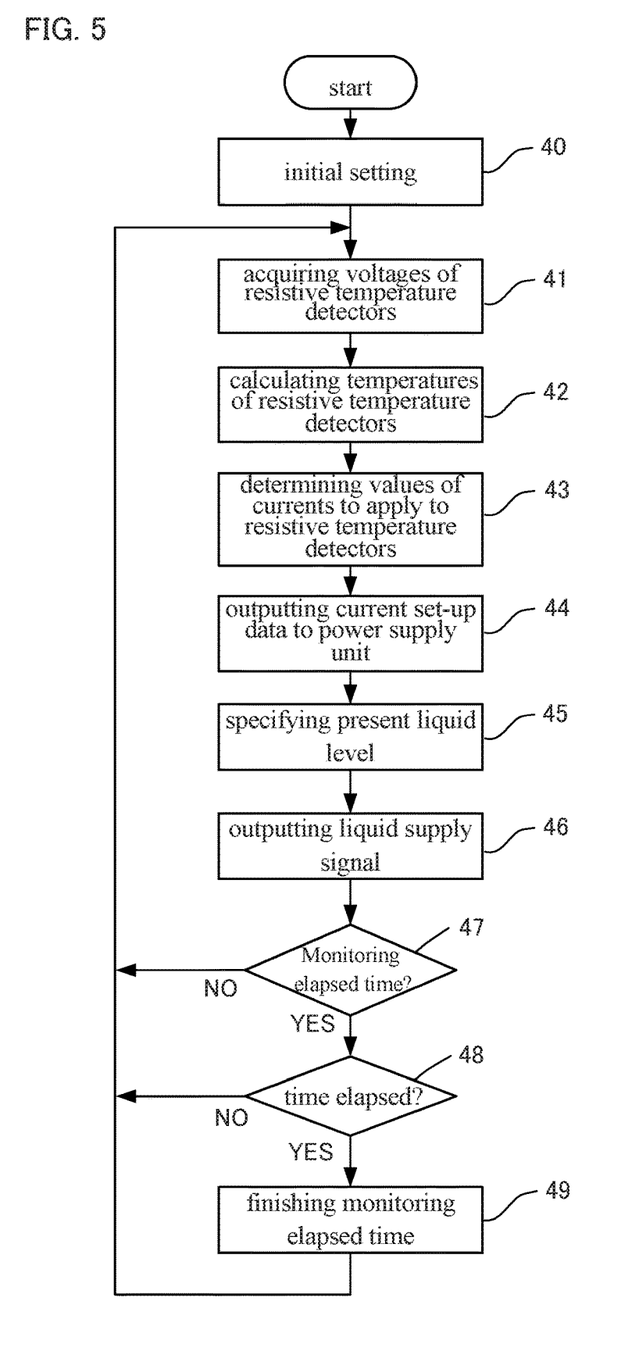
FIG. 5 is a flow chart showing an operation of the liquid level meter illustrated in FIG. 2.

In FIG. 5, a flow chart showing a processing by the control section 31 is shown. Hereinafter, referring to FIG. 5, an operation of the whole liquid level meter 30 is more specifically described. Here, the first to fourth resistive temperature detectors R11 to R14 are disposed at the predetermined heights and the initial liquid level S0 is located above the third resistive temperature detector R13 and the fourth resistive temperature detector R14 as shown in FIG. 3.

In a step 40, the control section 31 reads out the control parameters from the memory unit 34 and outputs data for determining the initial current values of the first to fourth resistive temperature detectors R11 to R14 to the power supply unit 32 out of the control parameters as the current set-up data. For example, the control parameters include initial current values of the currents I11 to I14 of the first to fourth resistive temperature detectors R11 to R14, a current threshold Is1 of the first resistive temperature detector R11, a current threshold Is3 of the third resistive temperature detector R13, resistance values R11(0) to R14(0) of the first to fourth resistive temperature detectors R11 to R14 at 0° C., the reference values of the temperature differences ΔTd and ΔTu, and an ON holding time Tr_timer.

The power supply unit 32 to which the initial current values of the first to fourth resistive temperature detectors R11 to R14 have been inputted supplies the currents (analogue) I11 to I14 respectively to the first to fourth resistive temperature detectors R11 to R14 with the internal D/A converter. Here, the currents I12 and I14 are the constant micro currents (for example, 2 mA), as described above.

In a step 41, the control section 31 acquires the respective voltages V11 to V14 (digital) across the first to fourth resistive temperature detectors R11 to R14 from the voltage measuring section 33. As previously described, at a predetermined timing, the voltage measuring section 33 measures the respective voltages V11 to V14 (analogue) across the first to fourth resistive temperature detectors R11 to R14, converts them into the digital data by the A/D converter, and outputs the data to the control section 31.

In a step 42, the control section 31 calculates the respective temperatures T1 to T4 of the first to fourth resistive temperature detectors R11 to R14 from the voltages V11 to V14 acquired in the step 41 by the above formula.

In a step 43, the control section 31 determines the values of the currents to apply to the first resistive temperature detector R11 and the third resistive temperature detector R13 based on the temperatures T1 to T4 calculated in the step 42. Specifically, the control section 31 determines the values of the currents to supply to the first resistive temperature detector R11 and the third resistive temperature detector R13 for conducting the feedback control so that T1−T2=ΔTd and T3−T4=ΔTu. For example, in case T1−T2>ΔTd, the control section 31 determines a smaller value comparing to the present current value I11 as a value of a current to supply to the first resistive temperature detector R11 next. In case T1−T2<ΔTd, the control section 31 determines a larger value comparing to the present current value I11 as a value of a current to supply to the first resistive temperature detector R11 next. In case T1−T2=ΔTd, the control section 31 determines the same value as the present current value I11 as a value of a current to supply to the first resistive temperature detector R11 next. Similarly, in case T3−T4>ΔTu, the control section 31 determines a smaller value comparing to the present current value I13 as a value of a current to supply to the third resistive temperature detector R13 next. In case T3−T4<ΔTu, the control section 31 determines a larger value comparing to the present current value I13 as a value of a current to supply to the third resistive temperature detector R13 next, and in case T3−T4=ΔTu, the control section 31 determines the same value as the present current value I13 as a value of a current to supply to the third resistive temperature detector R13 next.

In a step 44, the control section 31 outputs the current set-up data corresponding to the current value determined in the step 43 to the power supply unit 32. As described above, the power supply unit 32 accordingly supplies the currents corresponding to the inputted current set-up data to the first to fourth resistive temperature detectors R11 to R14.

In a step 45, the control section 31 identifies the positional relation among the present liquid level S, the first level Su, and the second level Sd. Specifically, the control section 31 determines that the liquid level S is below the second level Sd (S<Sd) when the present current value I11 is smaller than the threshold Is1 (I11<Is1) and also the present current value I13 is smaller than the threshold Is3 (I11<Is1). The control section 31 determines that the liquid level S is between the first level Su and the second level Sd (Sd≤S≤Su) when the present current value I11 is not less than the threshold Is1 (I11≥Is1) and also the present current value I13 is smaller than the threshold Is3 (I11<Is1). The control section 31 determines that the liquid level S is above the first level Su (S>Su) when the present current value I11 is not less than the threshold Is1 (I11≥Is1) and also the present current value I13 is not less than the threshold Is3 (I13≥Is1).

In a step 46, the control section 31 outputs the liquid supply signal SG based on the determination result in the step 45.

Specifically, when S<Sd, the control section 31 outputs the liquid supply signal SG of a level (for example, a high level) which causes the liquid supply device to supply the liquid L to the container T. At the same time, the control section 31 acquires a present time from the timer 35 to store it as a start time in the internal RAM. In case the start time is already stored, the stored start time is kept. As described later, the start time is used for maintaining the liquid supply signal SG at the high level to keep the supply of the liquid L by the liquid supply device at least during the ON holding time Tr_timer.

When Sd≤S≤Su, in case the liquid supply signal SG is at the high level and the start time is not stored in the RAM, the control section 31 outputs the liquid supply signal SG of a level (a low level) which causes the liquid supply device to stop the supply of the liquid L to the container T. The control section 31 maintains the liquid supply signal SG at the high level when the start time is stored in the RAM (as described later, this means that the ON holding time Tr_timer has not elapsed).

When S>Su, the control section 31 outputs the liquid supply signal SG of the level (low level) which causes the liquid supply device to stop the supply of the liquid L to the container T. At that time, the control section 31 turns the liquid supply signal SG to the low level without determining whether the start time is stored in the RAM or not, in other words, without considering whether the ON holding time Tr_timer has elapsed or not.

In a step 47, the control section 31 determines whether the lapse of the ON holding time Tr_timer is presently monitored or not. Specifically, the control section 31 determines whether the start time is stored in the RAM. In case the start time is not stored, it is determined that the time lapse is not monitored and the control processing is restored to the step 41 and the above steps are repeated. In case the start time is stored, it is determined that the time lapse is monitored and the control processing is advanced to a step 48.

In the step 48, the control section 31 determines whether the ON holding time Tr_timer has elapsed or not. Specifically, the control section 31 acquires the present time from the timer 35 and compares it with the start time stored in the RAM to determine whether the ON holding time Tr_timer has elapsed or not. In case the ON holding time Tr_timer has not elapsed, the control processing is restored to the step 41 and the above steps are repeated. In case the ON holding time Tr_timer has elapsed, the control processing is advanced to a step 49.

In the step 49, the control section 31 deletes the start time stored in the RAM to finish monitoring the time lapse. Then, the control processing is restored to the step 41 and the above steps are repeated.

A series of the processing including the steps 40 to 49 is finished by the power-off of the liquid level meter 30.

By following the steps 40 to 49, the liquid level meter 30 can repeatedly monitors the liquid level and supplies the liquid into the container T from the external liquid supply device when the liquid level S goes below the second level Sd and then stops the supply of the liquid from the external liquid supply device into the container T when the liquid level S goes above the first level Su. By the above processing, the level of the liquid L in the container T may be maintained within an appropriate range.

By the steps 40 to 49 repeated, the current value I11 of the first resistive temperature detector R11 is controlled to be around the threshold Is1 so that T1−T2=ΔTd and the current value I13 of the third resistive temperature detector R13 is controlled to be around the threshold Is3 so that T3−T4=ΔTu. This is shown in FIGS. 6 and 7.

Figure 6:
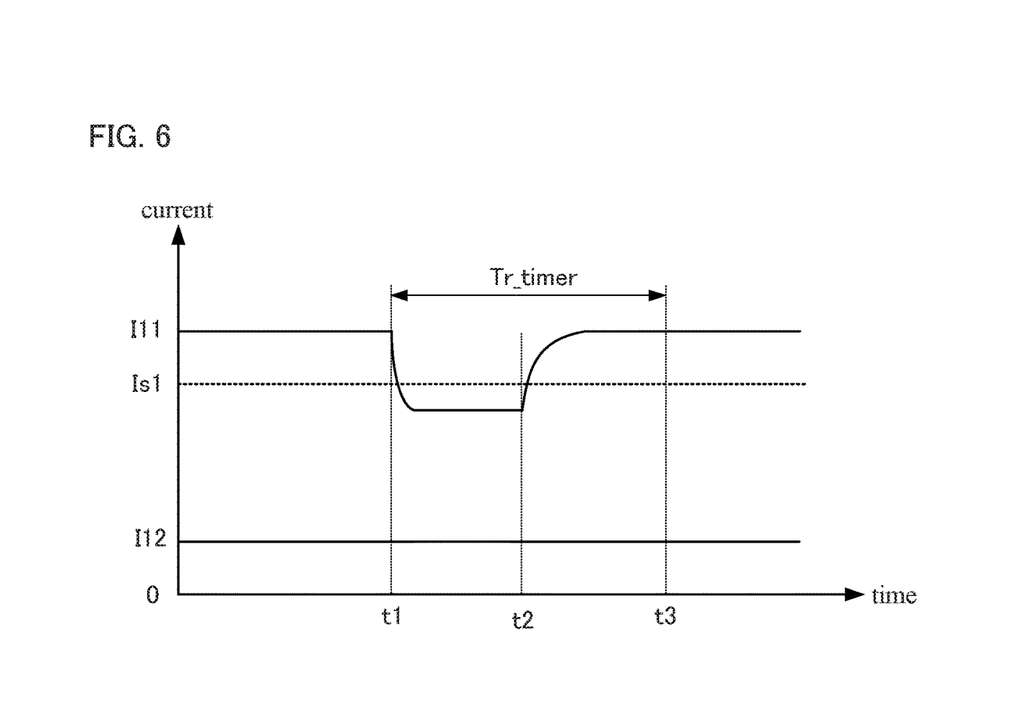
FIG. 6 is a graph showing a current value of the resistive temperature detector for detecting a positional relation between a liquid level and an upper limit.

In FIG. 6, when I11>Is1 (the liquid level S>Sd), the temperature of the first resistive temperature detector R11 rises as the liquid level goes down to be S<Sd due to the discharge of the gas G and it accordingly becomes to T1−T2>ΔTd at a time t1, then the current I11 is gradually reduced (at this time the supply of the liquid is started) so that it becomes to I11<Is1 and finally becomes to a state of equilibrium (T1−T2=ΔTd). After that, the temperature of the first resistive temperature detector R11 goes down when the first and second resistive temperature detectors R11 and R12 are submerged in the liquid as the liquid level rises due to the supply of the liquid and it accordingly becomes T1−T2<ΔTd at a time t2 and then the current I11 is gradually increased so that it becomes to I11>Is1 and finally becomes to the state of equilibrium (T1−T2=ΔTd). Here, the supply of the liquid is kept until a time t3 when the ON holding time Tr_timer has elapsed. The current I11 is controlled every time when the liquid level S goes down to be S<Sd as shown in FIG. 6. The current I12 is maintained at a constant value.

Figure 7:
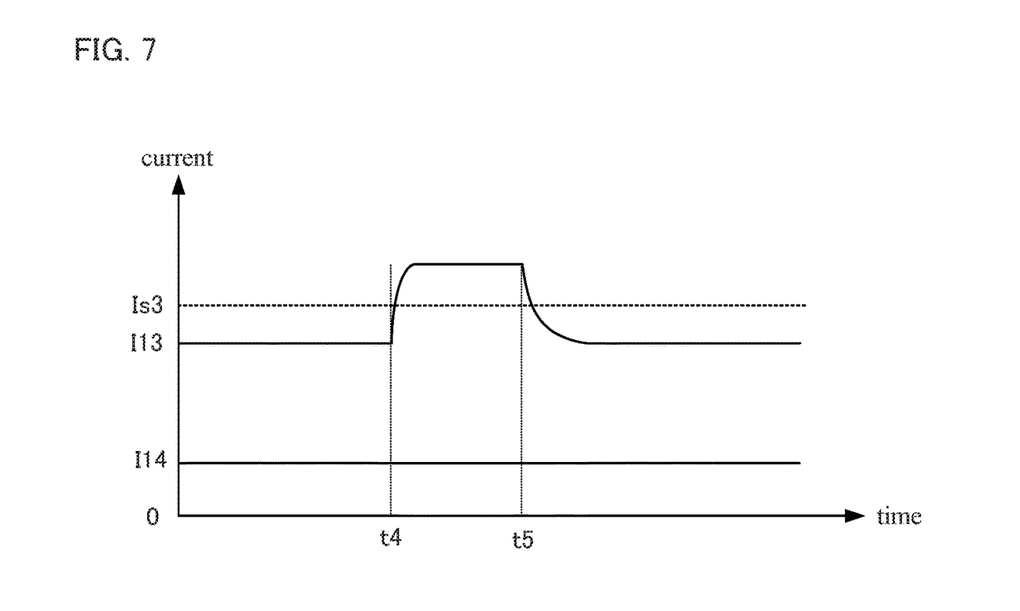
FIG. 7 is a graph showing a current value of the resistive temperature detector for detecting a positional relation between the liquid level and a lower limit.

In FIG. 7, when I13<Is3 (the liquid level S<Su), the temperature of the third resistive temperature detector R13 goes down when the third resistive temperature detector R13 is submerged in the liquid as the liquid level goes up to be S>Su due to the supply of the liquid and it accordingly becomes to T3−T4<ΔTu at a time t4, then the current I13 is gradually increased (at this time the supply of the liquid is stopped) so that it becomes to I13>Is3 and finally becomes to a state of equilibrium (T3−T4=ΔTu). After that, the temperature of the third resistive temperature detector R13 goes up when the third and fourth resistive temperature detectors R13 and R14 are exposed from the liquid as the liquid level S lowers due to the discharge of the gas G and it accordingly becomes T3−T4>ΔTu at a time t5 and then the current I13 is gradually decreased so that it becomes to I13<Is3 and finally becomes to the state of equilibrium (T3−T4=ΔTu). The current I13 is controlled every time when the liquid level S goes up to be S>Su as shown in FIG. 7. The current I14 is maintained at a constant value.

As described above, same as in the first embodiment, the self-heating resistive temperature detectors (the first and third resistive temperature detectors R11 and R13) and the ambient temperature measuring resistive temperature detectors (the second and fourth resistive temperature detectors R12 and R14) are operated with constant temperature differences. In other words, since the first resistive temperature detector R11 and the second resistive temperature detector R12 are disposed at the same height and the third resistive temperature detector R13 and the fourth resistive temperature detector R14 are disposed at the same height to control the currents of the first and third resistive temperature detectors R11 and R13 so that 1T1−T2 and T3−T4 are respectively constant, detection of the liquid level can be conducted without being affected by the ambient temperature and excessive power is not applied to the resistive temperature detectors and thus a service-life can be prolonged. Furthermore, a production cost can be reduced since the resistive temperature detectors of the same specification such as the 100Ω platinum resistive temperature detectors that are the general-purpose products can be used as the first to fourth resistive temperature detectors R11 to R14.

The configuration shown in FIG. 2 is an example and any configurations are possible as long as a liquid level can be detected by the above operation principle (operation of multiple resistive temperature detectors with constant temperature differences). It may be possible to detect a liquid level with only a pair of resistive temperature detectors disposed at the same height, in the similar manner as the first embodiment, in reference to the positions of the resistive temperature detectors.

On the other hand, according to application, it may be also possible to detect a liquid surface level with three or more pairs of resistive temperature detectors in reference to the three or more different positions.

In addition, the number of the resistive temperature detectors to which the micro currents are supplied for measuring the ambient temperature may be less than the number of the resistive temperature detectors on which the feedback control of the current values is conducted. In FIG. 3, for example, either the second resistive temperature detector R12 or the fourth resistive temperature detector R14 is not always required. It is optional to choose which of these two to exclude. In case the second resistive temperature detector R12 is not included, the feedback control of the current I11 of the first resistive temperature detector R11 should be conducted so that T1−T4 is a constant value (for example, ΔTd). Here, in the case shown in FIG. 3, when the number of the resistive temperature detectors to which the micro currents are supplied for measuring the ambient temperature is reduced to one, it is preferable to keep the fourth resistive temperature detector R14 and exclude the second resistive temperature detector R12 because the temperature of the liquid L in the container T may rapidly change in case the liquid at a low temperature is put into the container T from outside with the all resistive temperature detectors are exposed from the liquid L therein.

Although the case where the control section 31 executes the program read out from the memory unit 34 is described above, the control section 31 may be realized by a dedicated IC such as ASIC and FPGA. In that case, the control section 31 may be realized by a single IC or multiple ICs. For example, function blocks shown in FIG. 4 may be respectively realized by ICs.

The flow chart in FIG. 5 is an example and may be variously changed. For example, it may be possible that the processing for determining the liquid level (steps 45 and 46) is conducted before the processing for determining the next current values (steps 41 to 44).

In addition, an optional way may be adopted as the way for conducting the feedback control of the currents of the resistive temperature detectors with the constant temperature differences. For example, the current value of the first resistive temperature detector R11 calculated by the above formula so that T1−T2 is the predetermined value of ΔTd may be adopted as the value of the current to nextly apply to the first resistive temperature detector R11. Similarly, the current value of the third resistive temperature detector R13 calculated by the above formula so that T3−T4 is the predetermined value of ΔTu may be adopted as the value of the current to nextly apply to the third resistive temperature detector R13.

The ON holding time Tr_timer may be an appropriate value considering conditions including a capacity of the container T and a capability of the liquid supply device (a supply quantity per unit time). It may be that the ON holding time Tr_timer=0 or the initial parameters may not include the ON holding time Tr_timer. In that case, the processing involved in the elapsed time monitoring should not be executed. ΔTd and ΔTu may be values respectively having prescribed widths. In other words, T1−T2=ΔTd may mean ΔTd−Δ1<T1−T2<ΔTd+Δ1 and T3−T4=ΔTu may mean ΔTu−Δ2<T3−T4<ΔTu+Δ2 with Δ1 and Δ2 being minute values.

The second and fourth resistive temperature detectors R12 and R14 for ambient temperature measurement are not limited to the resistive temperature detectors but may be anything capable of measuring a temperature (temperature measuring body). For example, they may be thermocouples.

In addition, since the temperature of the resistive temperature detector corresponds to its resistance value, a feedback control may be applied to the currents I11 and I13 so that a difference between the current values of the first and second resistive temperature detectors R11 and R12 and a difference between the current values of the third and fourth resistive temperature detectors R13 and R14 are respectively constant. In that case, in the flow chart shown in FIG. 5, the present resistance values may be calculated by a formula, V1$j$/I1$j$ (j=1 to 4) instead of calculating the temperatures from the current values of the first to the fourth resistive temperature detectors R11 to R14.

Here, the case where the liquid level meter according to the present invention is used for a raw material vaporization and supply apparatus is described but this is not the only case. The liquid level meter of the present invention may be used for a canister (a container for carrying gas) for a semiconductor or the like. In other words, a container equipped with the liquid level meter of the present invention and a vaporizer using the container may be realized.

The embodiments described herein are examples and the present invention is not limited to the above embodiments. The scope of the present invention is specified by each claim with taking into consideration of the detailed description of the invention and all changes which come within the range of equivalency of the claims are intended to be embraced therein.

INDUSTRIAL APPLICABILITY

According to the present invention, a liquid level detection circuit and a liquid level meter that can detect a liquid level without being affected by an ambient temperature by driving a self-heating resistive temperature detector and an ambient temperature measuring resistive temperature detector with a constant temperature difference and that also can prolong its service-life by conducting the temperature control with the constant temperature difference without applying excessive power to the resistive temperature detectors are provided.

REFERENCE SIGNS LIST 1 liquid level detection circuit
2 first resistor
3 first line
4 second resistor
5 third resistor
6 second line
7 bridge circuit
8 transistor
9 fourth resistor
10 fifth resistor
11 third line
12 sixth resistor
13 seventh resistor
14 fourth line
15 comparator
16 fifth line
17 18 buffer circuit
R1 self-heating resistive temperature detector
R2 ambient temperature measuring resistive temperature detector
V power source
30 liquid level meter
31 control section
32 power supply unit
33 voltage measuring section
34 memory unit
35 timer
36 clock generation section
37 temperature detection section
38 current control section
39 liquid level detection section
R11 first resistive temperature detector
R12 second resistive temperature detector
R13 third resistive temperature detector
R14 fourth resistive temperature detector

The invention claimed is:

1. A liquid level meter, comprising:
a first resistive temperature detector to which a current of an variable magnitude is applied;
a first temperature measuring body provided close to the first resistive temperature detector;
a liquid level detector detecting a liquid level based on temperatures of the first resistive temperature detector and the first temperature measuring body;
a temperature detector detecting the temperatures of the first resistive temperature detector and the first temperature measuring body;
a current controller determining a value of current to apply to the first resistive temperature detector so that a difference between the temperature of the first resistive temperature detector and the temperature of the first temperature measuring body is maintained at a first constant value; and
a power supply applying the current of the current value determined by the current controller to the first resistive temperature detector; wherein
the liquid level detector determines whether the first resistive temperature detector is in a liquid or outside of the liquid using the value of the current applied to the first resistive temperature detector.

2. The liquid level meter according to claim 1, wherein the first temperature measuring body is a resistive temperature detector to which a current weaker than the current applied to the first resistive temperature detector is applied.

3. The liquid level meter according to claim 1, wherein the liquid level detector determines whether the first resistive temperature detector is in the liquid or outside of the liquid by determining if the value of the current applied to the first resistive temperature detector is larger than a predetermined first threshold or not.

4. The liquid level meter according to claim 1, further comprising:
a voltage sensor measuring a voltage across the first resistive temperature detector, wherein
the temperature detector determines the temperature of the first resistive temperature detector from the voltage across the first resistive temperature detector measured by the voltage sensor,
in case the difference is larger than a predetermined reference value, the current controller determines a smaller value comparing to the value of the current being applied to the first resistive temperature detector as a value of a current to apply to the first resistive temperature detector,
in case the difference is smaller than the reference value, the current controller determines a larger value comparing to the value of the current being applied to the first resistive temperature detector as a value of a current to apply to the first resistive temperature detector, and
in case the difference is equal to the reference value, the current controller determines the same value as the value of the current being applied to the first resistive temperature detector as a value of a current to apply to the first resistive temperature detector.

5. The liquid level meter according to claim 1, further comprising:
a second resistive temperature detector to which a current of the variable magnitude is applied, wherein
the second resistive temperature detector is disposed at a different height from that of the first resistive temperature detector,
the temperature detector detects a temperature of the second resistive temperature detector,
the current controller determines a value of a current to apply to the second resistive temperature detector so that a difference between the temperature of the second resistive temperature detector and the temperature of the first temperature measuring body is maintained at a second constant value,
the power supply applies the current of the value of the current to apply to the second resistive temperature detector determined by the current controller to the second resistive temperature detector, and the liquid level detector determines whether the second resistive temperature detector is in the liquid or outside of the liquid using the value of the current applied to the second resistive temperature detector.

6. The liquid level meter according to claim 5, wherein the second resistive temperature detector is disposed at a lower position than those of the first resistive temperature detector and the first temperature measuring body.

7. The liquid level meter according to claim 1, further comprising:
a second resistive temperature detector to which the current of the variable magnitude is applied; and
a second temperature measuring body disposed near the second resistive temperature detector, wherein
the second resistive temperature detector is disposed at a different height from that of the first resistive temperature detector,
the temperature detector detects a temperature of the second resistive temperature detector and a temperature of the second temperature measuring body,
the current controller determines the value of the current to apply to the second resistive temperature detector so that a difference between the temperature of the second resistive temperature detector and the temperature of the second temperature measuring body is maintained at a second constant value,
the power supply applies the current of the value of the current to apply to the second resistive temperature detector determined by the current controller to the second resistive temperature detector, and
the liquid level detector determines whether the second resistive temperature detector is in the liquid or outside of the liquid using the value of the current applied to the second resistive temperature detector.

8. The liquid level meter according to claim 7, wherein the second resistive temperature detector and the second temperature measuring body are disposed at higher positions than those of the first resistive temperature detector and the first temperature measuring body,
the liquid level detector outputs a signal to raise the liquid level when the difference between the temperature of the first resistive temperature detector and the temperature of the first temperature measuring body becomes larger than the first constant value, and
the liquid level detector outputs a signal to stop the rise of the liquid level when the difference between the temperature of the first resistive temperature detector and the temperature of the first temperature measuring body becomes smaller than the first constant value.

9. The liquid level meter according to claim 8, wherein the liquid level detector keeps outputting the signal to raise the liquid level instead of outputting the signal to stop the rise of the liquid level in case the difference between the temperature of the first resistive temperature detector and the temperature of the first temperature measuring body becomes smaller than the first constant value within a predetermined period of time after the difference between the temperature of the first resistive temperature detector and the temperature of the first temperature measuring body once becomes larger than the first constant value.

10. The liquid level meter according to claim 9, wherein the liquid level detector outputs the signal to stop the rise of the liquid level when the difference between the temperature of the second resistive temperature detector and the temperature of the second temperature measuring body becomes smaller than the second constant value.

11. The liquid level meter according to claim 7, wherein the first resistive temperature detector, the second resistive temperature detector, the first temperature measuring body, and the second temperature measuring body are platinum resistive temperature detectors.

12. A container, comprising:
the liquid level meter according to claim 1 attached thereto, wherein
a level of a liquid contained therein is detected by the liquid level meter.

13. A vaporizer, comprising:
the container according to claim 12, wherein
the liquid to be vaporized is contained in the container.

* * * * *